United States Patent [19]
Little et al.

[11] Patent Number: 6,031,656
[45] Date of Patent: Feb. 29, 2000

[54] BEAM-ADDRESSED MICROMIRROR DIRECT VIEW DISPLAY

[75] Inventors: Michael J. Little, Woodland Hills; William P. Robinson, Thousand Oaks, both of Calif.

[73] Assignee: MEMSolutions, Inc., Westlake Village, Calif.

[21] Appl. No.: 09/179,933

[22] Filed: Oct. 28, 1998

[51] Int. Cl.[7] ............................. G02B 26/02; G02B 26/08
[52] U.S. Cl. ......................... 359/293; 359/227; 359/230; 348/795
[58] Field of Search .................................. 359/227, 230, 359/293; 313/309; 315/366; 348/795, 781, 782, 740

[56] References Cited

U.S. PATENT DOCUMENTS

| | | | |
|---|---|---|---|
| 3,553,364 | 1/1971 | Lee ........................................ | 178/7.3 D |
| 3,648,281 | 3/1972 | Dahms et al. ........................... | 340/373 |
| 3,897,997 | 8/1975 | Kalt ........................................ | 350/161 |
| 4,160,583 | 7/1979 | Ueda ....................................... | 350/269 |
| 4,176,345 | 11/1979 | Micheron et al. ...................... | 340/373 |
| 4,229,075 | 10/1980 | Ueda et al. ............................ | 359/227 |
| 4,564,836 | 1/1986 | Vuilleumier et al. .................. | 340/783 |
| 4,786,898 | 11/1988 | Hata et al. ............................. | 340/783 |
| 5,083,857 | 1/1992 | Hornbeck ............................... | 359/291 |
| 5,142,405 | 8/1992 | Hornbeck ............................... | 359/226 |
| 5,196,767 | 3/1993 | Leard et al. ........................... | 315/349 |
| 5,280,277 | 1/1994 | Hornbeck ............................... | 345/108 |
| 5,285,196 | 2/1994 | Gale, Jr. ................................ | 345/108 |
| 5,382,961 | 1/1995 | Gale, Jr. ................................ | 345/108 |
| 5,444,566 | 8/1995 | Gale et al. ............................. | 359/291 |
| 5,477,110 | 12/1995 | Smith et al. ........................... | 315/169.3 |
| 5,552,925 | 9/1996 | Worley ................................... | 359/230 |
| 5,557,177 | 9/1996 | Engle ..................................... | 315/366 |
| 5,600,383 | 2/1997 | Hornbeck ............................... | 348/771 |
| 5,610,478 | 3/1997 | Kato et al. ............................. | 315/169.1 |
| 5,677,784 | 10/1997 | Harris ..................................... | 359/290 |
| 5,689,278 | 11/1997 | Barker et al. .......................... | 345/74 |
| 5,784,189 | 7/1998 | Bozler et al. .......................... | 359/254 |
| 5,784,190 | 7/1998 | Worley ................................... | 359/291 |
| 5,835,256 | 11/1998 | Huibers .................................. | 359/291 |

OTHER PUBLICATIONS

S. Newman, et al., "Development of a 5.1 Inch Field Emission Display," Motorola Flat Panel Display Division, SID 1998.

Lawrence Dworsky, et al., "Field Emission Display Technology and Applications," Motorola Flat Panel Display Division, SID 1998.

B.R. Chalamala, et al., "Fed up with Fat Tubes," IEEE Spectrum; vol. 35, No. 4, pp. 42–51; Apr. 1998.

Robert T. Smith, "Electronics Development for Field–Emission Displays," Society for Information Display, pp. 12–15; Feb. 1998.

S.T. de Zwart, et al., "Basic Principles of a New Thin Flat CRT," SID Digest, pp. 239–242; 1997.

A.R. Knox, et al., "A Flat–Panel CRT with a Permanent Magnet Aperture Plate," SID Digest, pp. 251–254; 1997.

E. Yamaguchi et al., "A 10–in. Surface–Conduction Electron–Emitter Display," SID Digest, pp. 52–55; 1997.

C.J. Spindt, et al., "ThinCRT™ Flat–Panel–Display Construction and Operating Characteristics," SID Digest pp. 99–102; 1998.

*Primary Examiner*—Georgia Epps
*Assistant Examiner*—Margaret Burke
*Attorney, Agent, or Firm*—Fleshner & Kim

[57] ABSTRACT

A flat-panel direct view display positions an array of electrostatically-actuated cantilevered micromirrors in front of a contrasting background and opposite a flat-panel electron beam source. Depending upon the display configuration, the electron beam source addresses either the array of micromirrors or a reference surface a row at a time while the other is held at a reference potential. The electron beams modulate the potential difference between each micromirror and the reference surface thereby adjusting the magnitude of the attractive electrostatic force between the two. This in turn modulates the deflection of the micromirrors between their quiescent and fully actuated states to selectively cover and uncover the background thereby producing a grey scale direct-view image.

24 Claims, 4 Drawing Sheets

BEAM-ADDRESSED MICROMIRROR DIRECT VIEW DISPLAY

BACKGROUND OF THE INVENTION

1. Field of the Invention

This invention relates to direct view displays and more specifically to a paper white display that combines flat-panel addressing technology with a micromirror faceplate.

2. Description of the Related Art

Direct-view displays convert electrical signals into images that can be viewed directly without the aid of magnification or projection. The market for direct view displays spans a continuum of performance and price that includes the ultra high performance but very expensive flat-panel DTVs, moderately performing and priced laptop computers, and the lower performing but much cheaper personal digital assistants, electronic books and cellular telephones. The high end displays offer high spatial and color resolution but are very expensive and consume a lot of power. The low end displays offer less resolution but are relatively cheap and can be operated off of battery power.

The most common direct view technology is the cathode ray tube (CRT), in which a scanning electron gun shoots a single beam of electrons across a vacuum to scan a phosphor-coated anode. The electrons penetrate the individual phosphors causing them to emit light, which can be viewed directly or projected onto a screen. The brightness of CRT displays is inherently limited by the phosphors ability to emit light. In addition, many CRT displays decay to a half-brightness level after about one year of use.

By necessity, the gun in a CRT must sit far from the anode to raster scan the phosphor screen, a distance similar to the width of the display area As a result, high-resolution large area CRT displays are correspondingly very bully, and thus not suitable for portable displays. During the past 40 years numerous attempts have been made to construct a "Flat-CRT" for direct view applications, which can overcome the size and power limitations of the conventional CRT without sacrificing performance.

The Aiken thin CRT, or "Thintube," was invented in the 1950s and was produced in small quantities in the early 1960s. The Thintube uses a single electron gun positioned in the plane of the phosphor screen in conjunction with horizontal and vertical deflection plates that first turned the beam down the selected row and then turned the beam to address the phosphor screen at the selected column. The contrast, size and luminance achieved by the Thintube rival those achieved by current flat panel technologies. Phillips and Sharp are currently developing variants of the original Thintube technology.

Matrix addressed flat panel displays such as the Plasma Display Panel (PDP) and Field Emission Display (FED) are two of the more promising and established phosphor-based flat-CRT technologies. Emerging flat panel technologies include the surface conduction electron (SCE) array, the metal-insulator-metal (MIM) cathode array and the Magnetic Matrix Display (MMD) that are being pioneered by Canon, Hitachi and IBM, respectively, to drive a phosphor screen.

The PDP can be thought of as a set of matrix addressed neon bulbs. An AC or DC voltage applied across a small gap containing an emitting gas, e.g. 3–10% Xenon diluted in either Helium or Neon, causes the gas to ionize and emit ultra violet light, which in turns excites the RGB phosphors to produce visible light. PDPs have been fabricated as large display areas with wide viewing angles and fill-color performance but its lumens/watt efficiency is very poor. The low efficiency and relatively high cost limits the PDP to a few niche applications such as a wall-hanging displays with a diagonal of one meter or more.

The FED utilizes a matrix addressed cold cathode array, spacers to support the atmospheric pressure, and cathodoluminescent phosphors for efficient conversion of the electron beam into visible light. The non-linearity of the current/voltage relationship permits matrix addressing of high information content displays while providing high contrast ratio. The FED combines the best properties of CRTs (full color, fill grey scale, brightness, video rate speeds, wide viewing angle and wide temperature range) with the best attributes of Flat Panel technology (thin and light weight, linearity and color convergence). However, the current FEDs have limited display sizes, a 12 inch diagonal or less, due to the fabrication and vacuum packaging problems. Since the primary motivation for Flat-CRTs was to overcome the size and weight limitations of the conventional CRT for large display sizes, this is a serious problem to the successful commercialization of the FED technology.

The portable or laptop computer display market is dominated by liquid crystal display (LCD) technology and particularly the Active Matrix LCD (AMLCD) technology, also known as TFT (thin film transistor) displays. The a liquid crystal panel is fabricated with an array of thin film transistors, one per cell, that are driven by row and column drive electronics. The row drivers enable the transistors a row at a time while the column drivers apply selected voltages that are latched through the transistors to the respective cells. The voltage changes the transmissive characteristics of the liquid crystal, which in turn optically modulates the amount of light transmitted through the LCD. Liquid crystal imagers require the use of polarizers that absorb a large fraction of the light, typically 60%–70% and reduce optical efficiency. The TFT element and the electrical connections to it are made of opaque material. This further reduces the amount of transmitted light allowed by as much as 50% and also causes a pixelation effect.

Multiplexed LCDs were the precursor to AMLCDs. Multiplexed LCDs sacrifice gray scale performance in favor of fabrication simplicity and power consumption by eliminating the TFT array. Because liquid crystals respond relatively slowly to changes in the applied voltage, the cell modulation is proportional to the root-mean-square (rms) voltage applied across the cell throughout the frame time. Although the voltage applied during the row enable is very large, the background noise created by the applied voltages for the remaining n−1 rows greatly reduces the RMS value of the margin between the off-state and full on-state of the liquid crystal. For example, commercially available AMLCDs can resolve about 16 million different colors while similarly available multiplexed LCDs can resolve only 256 different colors. As the number of scanned rows increases, this disparity in grey scale color resolution grows.

As a result, multiplexed LCDs are used in applications such as low end laptop computers and personal digital assistants (PDAs). These applications demand low cost and lower power consumption but can tolerate reduced gray scale resolution. Although they consume less power than AMLCDs, the multiplexed LCDs still consume too much power for many portable applications. Regardless of whether the display supports video applications or only non-video applications, these LCDs must be constantly refreshed, e.g. 30 times per second. Without a sustaining voltage they will decay from their modulated state to their relaxed state over time. Furthermore, the polarizers inherently required by LCDs absorb such a large fraction of the ambient light, they are unable to produce the "paper white" quality desired by the industry. As such consumers must make do with cell phones and PDAs whose gray displays are difficult to read even under the best ambient lighting conditions. Power consuming backlights must be added to improve their readability to minimum acceptable levels.

A more recent modification to the basic AMLCD technology is the Plasma Addressed Liquid Crystal (PALC) display. PALC uses the electrical switching properties of an ionized gas to actively address the liquid crystal pixels. In the integrated LCD/plasma structure of PALC, each scan line is defined by a plasma channel. The cathodes in the channels are sequentially scanned by applying a plasma discharge voltage, resulting in all pixels in each scanned line being addressed in a line-at-a-time fashion. PALC has the potential to exhibit high image quality, large display sizes and low manufacturing costs. Whereas AMLCDs use traditional integrated circuit lithography, PALC is more similar to printed circuit board lithography. Printed circuit boards can be made much larger and at lower costs than ICs.

A number of electromechanical shutter display technologies have been pursued and patented for direct view displays, but have not succeeded to large scale commercialization due to a variety of issues including fabrication, stiction, limited contrast ratio, poor optical efficiency, high cost and poor pixel uniformity.

U.S. Pat. No. 5,552,925 to Worley entitled "Electro-Micro-Mechanical Shutters on Transparent Substrates" combines micro-mechanical and silicon-on-transparent-substrate technologies to construct a transmissive micro-mechanical shutter array that is actuated by electrostatic forces in either an electric force/electric counter-force or electric force/mechanical counter-force configuration. In both configurations, the shutter array is addressed using an active matrix similar to that used in AMLCDs and thus will exhibit the same optical throughput and pixelation problems. Retention capacitors are used to hold the voltages across the shutters until the next frame.

Referring now to Worleys FIGS. 5 and 5A, there is shown a "flapper" type micro light shutter that comprises a flapper, a select MOSFET transistor, a row access line, and a column signal line formed on a substrate. Located above the shutter is a light mask comprised of a transparent substrate, a transparent ground electrode and an opaque blocking layer that shields the MOSFET transistor. When a voltage is applied between the flapper and an overhead ground plane, the electric force created pulls the flapper toward the plane. As the flapper moves in response to the electric force, a counter-force is provided by the spring constant of the flapper. As the voltage differential increases, the angle the flapper makes with the substrate increases, which in turn allows more light to pass through the transparent substrate. Because of the very low open aperture of this design, the optical throughput of this structure is too low to be commercially viable.

U.S. Pat. No. 3,553,364 to Lee entitled "Electromechanical Light Valve" describes an electromechanical light valve in an array of many such valves for controlling the transmission of light in continuously changing patterns. Each light valve consists of a housing having grounded conducting walls for shielding the interior thereof from external electrostatic forces produced by surrounding valves and a leaf shutter mounted in the housing. The application of a voltage to the leaf shutters causes the shutter to be attracted to the grounded conducting walls. As the voltage differential increases, the angle the shutter deflects increases, which in turn allows less light to pass through the housing.

Lee's design always involves the leaf shutters touching one surface or another, e.g. the conductive center plate or the grounded conductive walls, which can and will cause stiction due to the Van der Waals forces. Because Lee's design switches between these two surfaces, the leaf shutter will experience the non-linear pull-in effect, which precludes a controllable gray scale. The optical efficiency of this design is also very low on account of the low open aperture due to the opaque conductive sidewalls. In addition, the cost and complexity of fabricating an array of such housings makes high resolution displays impractical.

U.S. Pat. No. 4,564,836 to Vuilleumier et al. entitled "Miniature Shutter Type Display Device with Multiplexing Capability" describes a display device comprising an insulating carrier and shutters that are capable of rotating under the effect of an electric field. The shutters are grouped in pairs and are controlled by applying a voltage between the shutter and a counter-electrode. A holding voltage is then applied between the pair of shutters to hold them in place. Vuilleumier's device has no gray scale capability and involves shutters touching each other or a stop which can cause stiction problems. This design also has low optical efficiency due to the opaque sidewalls of the individual cavities.

U.S. Pat. No. 5,784,189 to Bozler et al. entitled "Spatial Light Modulator" discloses a spatial light modulator formed of a moveable electrode which is disposed opposite a fixed electrode, and is biased to roll in a preferred direction upon application of an electric field across the electrodes to produce a light valve or light shutter. As shown in FIG. 9, a reflection mode device is disclosed that uses a white background and black shutter coils. In one embodiment, the moveable electrode is a coiled electrode fixed at one end, which rolls up in a preferred direction and unrolls upon application of an electric field across the electrodes. In another embodiment shown in FIGS. 32–35, the moveable electrode is a hinged shutter having a bowl-like shape with two corners that contact electrical conductors and two corners that contact electrical insulators. The Van der Wall's forces between the corners and the electrical conductors are inherently stronger than the forces to the insulators. Therefore when a proper force is applied to the shutter, the insulator contacts will break free and the shutter will rotate about an axis passing through the two conducting contacts.

SUMMARY OF THE INVENTION

In view of the above problems, the present invention provides a thin, paper white direct view display.

This is accomplished with an array of electrostatically-actuated cantilevered micromirrors that are positioned in front of a contrasting background and opposite a flatpanel electron beam source. Depending upon the display configuration, the electron beam source addresses either the array of micromirrors or a reference surface a row at a time while the other is held at a reference potential. In either case, the flat-panel electron beam source modulates the potential difference between each micromirror and the reference surface opposing it thereby controlling the magnitude of the attractive electrostatic force between the two. This controlled voltage in turn modulates the deflection of the micromirrors between their quiescent and fully actuated states to selectively cover and uncover the background thereby producing a grey scale direct-view image. In one embodiment, the source deposits charge directly onto the mirrors, preferably their hinge structure. In another embodiment, the source deposits charge onto an insulating membrane that decouples the mirrors from the source and serves as the reference surface while the mirrors are held at reference potential.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a flat-panel direct view display that is capable of competing in the consumer flat-panel display markets. This new technology uses a transparent or translucent flat-panel source such as a field emitter array (FEA), a Thin CRT, a surface conduction electron (SCE) array, a metal-insulator-metal (MIM) cathode array or a Magnetic Matrix Display (MMD) to address an array of electrostatically-actuated micromirrors. The micromirrors are positioned in front of a contrasting background and are deflected over a wide range, approximately 0° to 90°, to produce a direct view grey scale image. The beam-addressed micromirror technology provides up to DTV resolution, contrast ratios on the order of 30:1. The most important feature of this design is its improved optical efficiency which provides a paper white display. This surpasses the current and projected capabilities of the flat panel phosphor and liquid crystal technologies.

Figure 1:
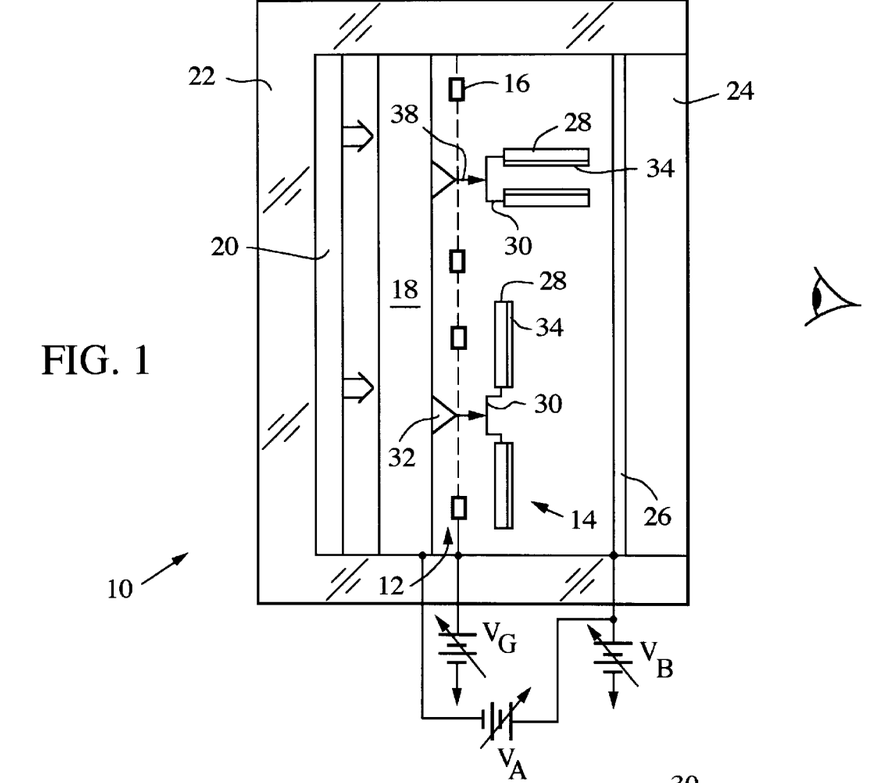
FIG. 1 is a sectional view of a direct view display in accordance with the present invention in which the beam and micromirror arrays are integrated on a common substrate.
Figure 2:
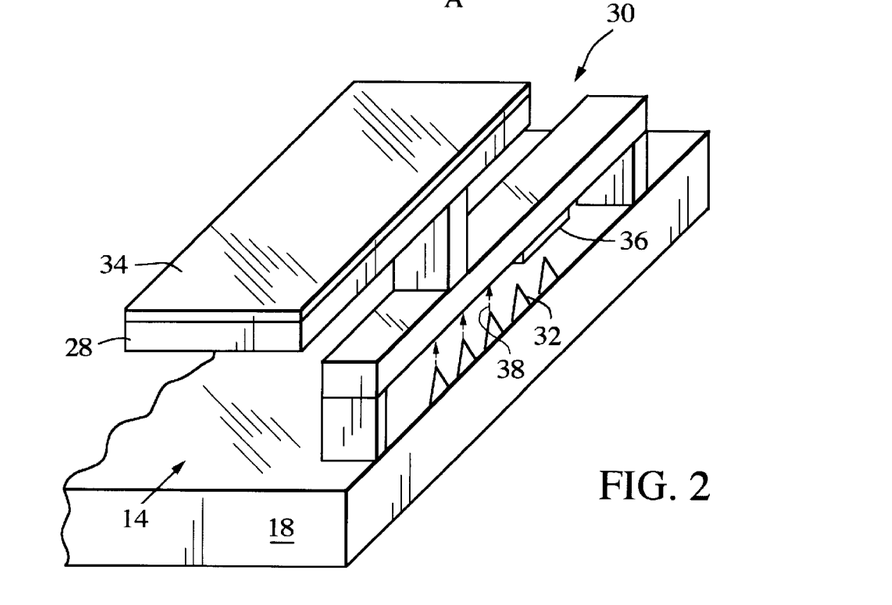
FIG. 2 is a perspective view of a micromirror and hinge of the type shown in FIG. 1.
Figure 3:
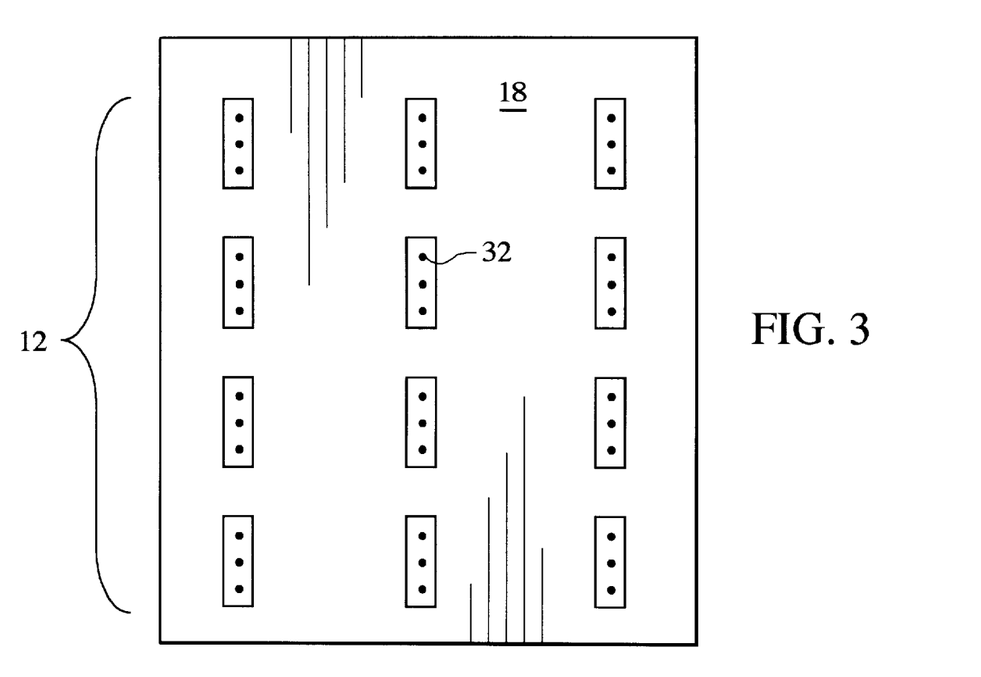
FIG. 3 is a plan view of the patterned FEA array shown in FIG. 1.

As shown in FIGS. 1, 2 and 3, one embodiment of a grey scale direct view display 10 includes a flat-panel source 12, which is depicted for purposes of illustration as a FEA, an array of electrically isolated micromirrors 14 and secondary electron collector grid 16 that are fabricated on a translucent white substrate 18. Collector grid 16 is biased at a relatively positive potential $V_G$ with respect to micromirrors 14. Substrate 18 is positioned in front of a backlight 20 inside a thin vacuum cell 22. The backside of cell faceplate 24 is coated with a conductive material, which may or may not be patterned, and is biased at a reference potential $V_B$ to define a reference electrode 26 opposite the micromirrors. Faceplate 24 is spaced and biased so that the micromirror can deflect a fill 90 degrees without contacting the faceplate.

The display can be configured so that each image pixel corresponds to one or more micromirrors 14. As depicted each pixel comprises a micromirror that has two petals 28 that are mounted on a common hinge structure 30. Because the petals preferably move to a fully upright position, FEA 12 as best illustrated in FIGS. 2 and 3 is patterned such that the individual field emitters 32 are placed underneath the mirrors and deposit charge onto the stationary hinge structure 30. Since both the hinge and the field emitters are opaque, this configuration has the added benefit of minimizing the opaque portion of each unit cell and thereby increasing the available contrast ratio.

In their quiescent position, each petal 28, which is preferably coated with an optically absorbing coating 34 so that its two opposing surfaces are highly absorbent and highly reflective, blocks a subpixel of transmitted light and absorbs incident light to produce a black state for that pixel. In their fully actuated position, the petals pass a substantial majority of the transmitted light and allow a substantial majority of the incident light to be reflected off of the contrasting substrate. The mirror's highly reflective backside assists in the collection of ambient light and thus further improves the display's white state. The closer the fully actuated position is to 90 degrees, the brighter the white state and the higher the contrast ratio. For example, a deflection range of 85 degrees might yield an 8:1 contrast ratio, a deflection of 88 degrees would yield a 15:1 contrast ratio, and a full 90 degree deflection may yield a 30:1 contrast ratio.

The micromirrors are deflected between their quiescent and fully actuated positions by attractive electrostatic forces created between the mirrors and the reference electrode. In short, the FEA deposits charge onto the mirrors to adjust their potentials. This in turn affects the potential differences between the mirrors and the reference electrode. The attractive electrostatic force on both the mirror and the reference electrode is proportional to the square of the potential difference. Since the reference electrode is fixed, the mirror deflects toward the reference electrode. The attractive force is opposed by the hinge's spring force so that the amount of deflection is determined by the force rebalance equation for a given geometry. The mirrors can be reset in a number of ways including addressing a secondary emission material (SEM) pad 36 as shown in FIG. 2, modulating the FEA's landing energy or by implementing a segmented collector grid that is switched between $V_G$ and ground reference potential.

More specifically, the potential difference between collector grid 16 and reference electrode 26 establishes a uniform electric field around micromirrors 14 such that collector grid 16 has a net positive charge Q and reference electrode 26 has an equal but opposite charge −Q. In the absence of any deposited charge, the mirror potential stabilizes at an equilibrium potential between the reference potential and the grid potential such that it satisfies the electric field between the reference electrode and the grid. The exact value of the mirror potential depends on the geometry of the collector grid and reference electrode and their relative spacing to the micromirror. Although the net charge on each micromirror is zero, the free electrons in the conductive mirror metal will distribute themselves so that an amount of negative charge −Q will reside on the underside of the mirror and an equal amount of positive charge Q will reside on the top surface of the mirror. The charge disparity produces an electric field that cancels the uniform electric field so that the electric field inside the conductive mirror is zero and produces equal and opposite attractive forces on the micromirror. Since the net force is zero the micromirror does not move.

To deflect the mirrors, FEA 12 emits primary electrons 38 that are accelerated through a potential $V_A$ towards the reference potential. The primary electrons pass through collector grid 16 and strike hinges 30 causing secondary electrons to be ejected and collected by collector grid 16 leaving a net charge that is distributed over the mirror petals. In order to deflect the mirror petals toward the reference electrode their potentials must be increased relative to the equilibrium potential.

For a typical application, the mirrors are reset (erased) and then driven (written) to their desired deflection a row at a time. In the configuration illustrated, the charge pattern is erased by driving the field emitters 32 to address SEM pad 36, which has an emission coefficient greater than one at the FEA beam energy, to raise the mirror potential up to a value slightly above the collector grid potential $V_G$. The exact difference depends on the low energy spectrum of the secondary electrons and the electrode geometry. This produces the maximum force imbalance on the micromirrors so that they deflect to their fully actuated position. Once erased, the field emitters 32 are modulated to address hinge 30, which has an emission coefficient less than one at the FEA beam energy, to lower the mirror potential to a desired value. This reduces the force imbalance on the micromirrors so that they are deflected back toward their quiescent position.

Alternately, the reference electrode and collector grid can be biased at the same potential so that the mirrors are erased to their quiescent position. Furthermore, instead of erasing each mirror, it is possible to selectively address the mirror and the SEM pad to differentially write the desired amount of charge. In any case, the display has a frame time utilization (FTU) approaching 100%.

Figure 4:
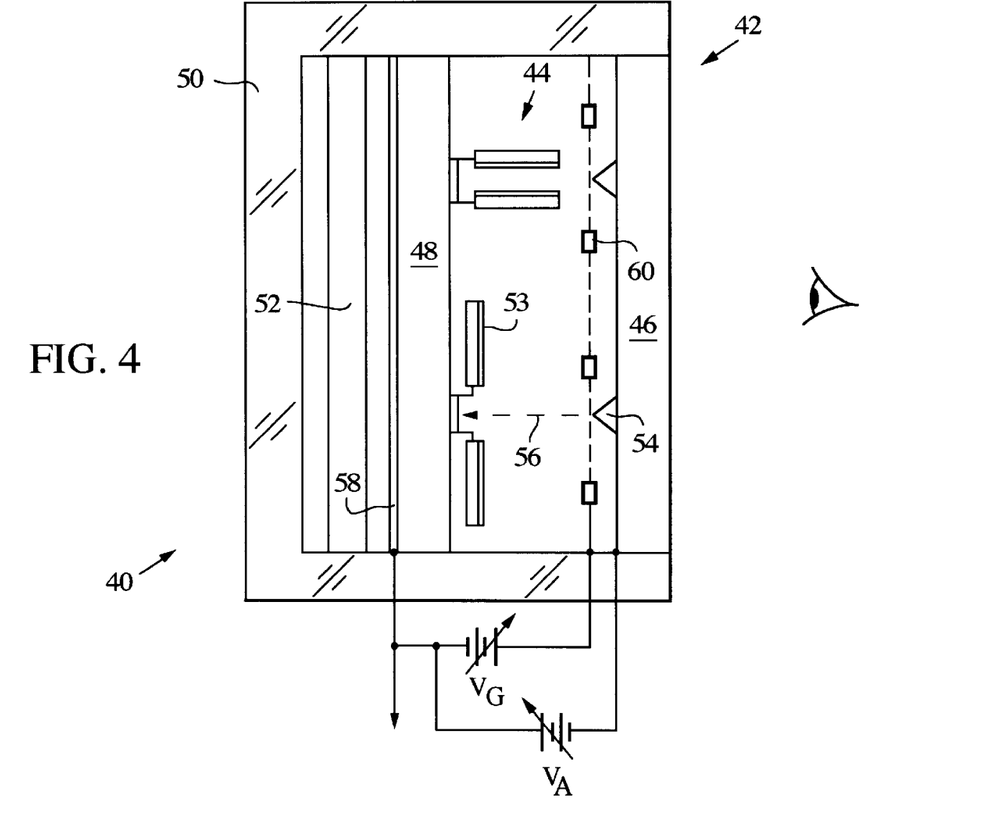
FIG. 4 is a sectional view of an alternate embodiment of the direct view display in which the beam and micromirror arrays are formed on opposing substrates.
Figure 5:
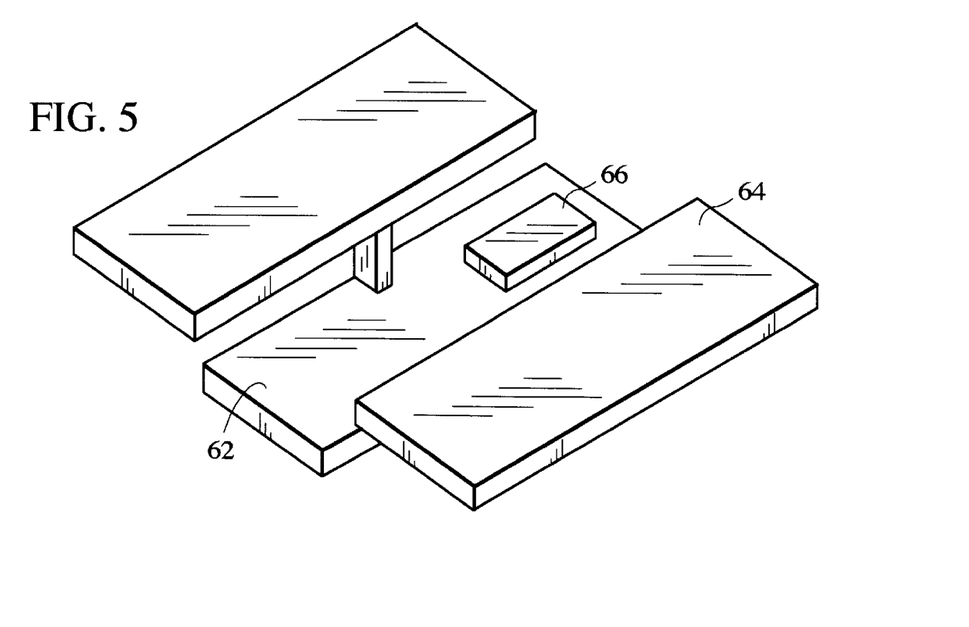
FIG. 5 is a perspective view of a micromirror pair and hinge of the type shown in FIG. 4.

As shown in FIGS. 4 and 5, another embodiment of a full grey scale direct view display 40 includes a flat-panel source 42, which is again depicted for purposes of illustration as a FEA, and an array of electrically isolated micromirrors 44 that are fabricated on separate substrates, 46 and 48 respectively, and aligned within a vacuum cell 50. In this configuration, the FEA substrate 46 forms the transparent cell faceplate. The mirror substrate 48 has a translucent white surface and is positioned in front of backlight 52. Alternately, the FEA could be fabricated on the translucent white substrate and the micromirror array fabricated on the faceplate. However, the surface of the mirror that is coated with an absorbing coating 53 would be exposed when the mirror was deflected to its fully actuated or white state, which would reduce contrast ratio.

Field emitters 54 emit primary electrons 56 that are accelerated through a potential $V_A$ towards an anode layer 58 coated on the back of substrate 48. The primary electrons pass through a collector grid 60 and selectively strike hinges 62, possibly petals 64, and SEM pad 66 causing secondary electrons to be ejected and collected by collector grid 60 to drive the mirrors between their quiescent and fully actuated positions. In this configuration, the uniform electric field is established between collector grid 60 and anode layer 58 and the actuating attractive force is generated between mirrors 44 and collector grid 60.

Figure 6:
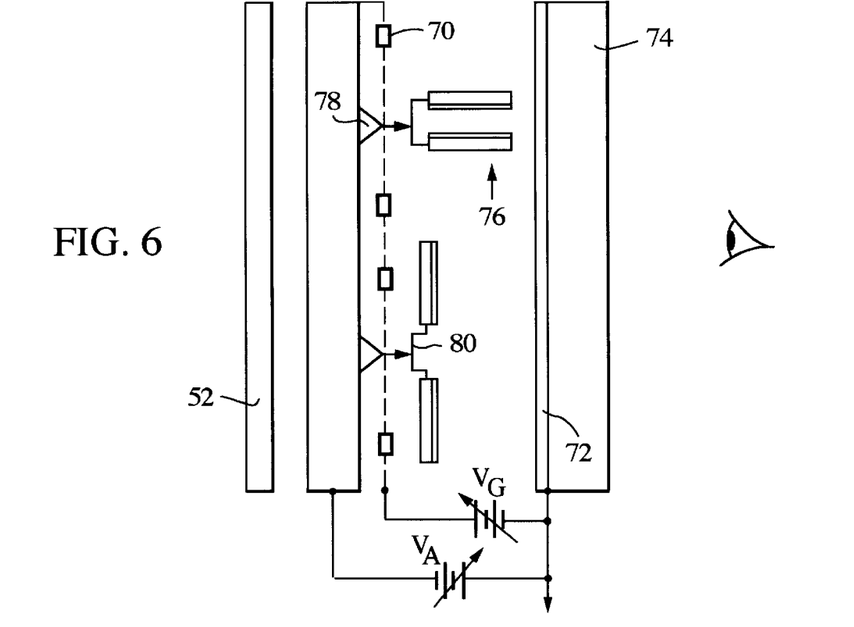
FIG. 6 is a sectional view of another embodiment of the direct view display in which the mirrors are fabricated with an upright quiescent state and the reference surface is formed on the substrate.

Another embodiment that is very similar to the one depicted in FIG. 1 except that the mirror's quiescent position is the fully upright position is shown in FIG. 6. This type of structure can be fabricated using LIGA techniques. The uniform electric field is established between a collector grid 70 and a reference electrode 72 on the cell faceplate 74 but the actuating attractive force is generated between mirrors 76 and collector grid 70 so that the mirrors are pulled down to a fully actuated or flat position.

In order to deflect the mirror petals toward the collector grid their potentials must be reduced rather than increased relative to the equilibrium potential. Even so the mirrors are erased by driving the field emitters 78 to address the SEM pad, which has an emission coefficient greater than one at the FEA beam energy, to raise the mirror potential up to a value slightly above the collector grid potential $V_G$. An emission coefficient greater than one provides the negative feedback required to stabilize at a reference potential and provide the uniform erase state. This produces the minimum force imbalance on the micromirrors so that they remain in their fully upright quiescent position. Once erased, the field emitters 78 are modulated to address hinge 80, which has an emission coefficient less than one at the FEA beam energy, to lower the mirror potential to a desired value. This increases the force imbalance on the micromirrors so that they are deflected toward the collector grid and toward their fully actuated flat position.

Figure 7:
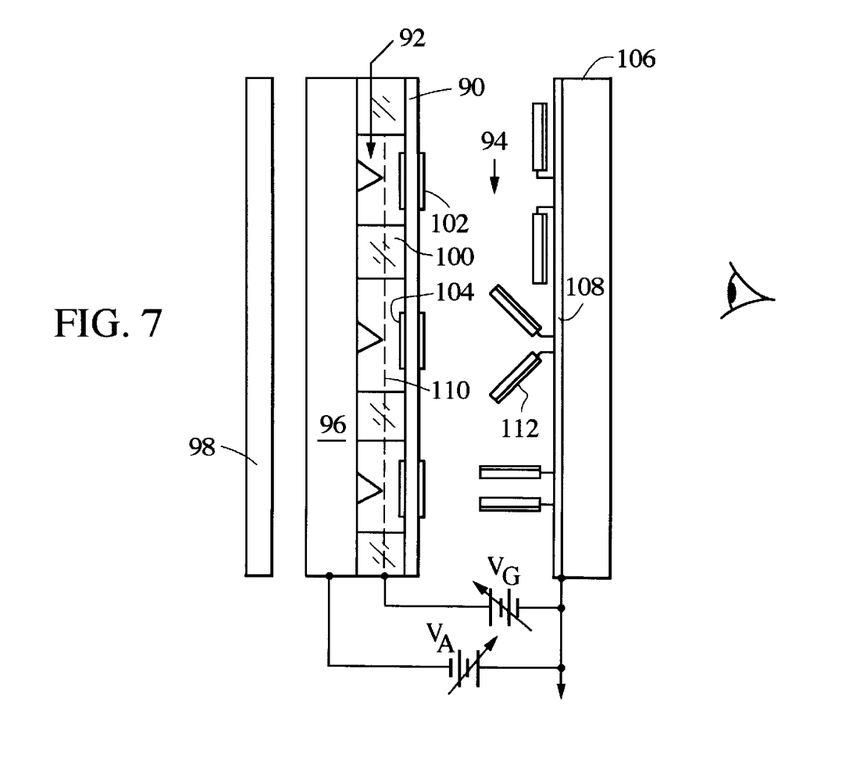
FIG. 7 is a sectional view of yet another embodiment of the direct view display in which a floating-potential insulating membrane decouples the beam and micromirror arrays.

In yet another embodiment, a thin floating-potential insulating membrane 90 is used to decouple the FEA 92 from the array of micromirrors 94 as shown in FIG. 7. FEA 92 is fabricated on a translucent white substrate 96 that is positioned in front of a backlight 98. An insulating post array 100 is built up on substrate 96 to support membrane 90. Attractors pads 102 and 104 are preferably formed on either side of membrane 90 to improve the uniformity and charge efficiency of the attractive electrostatic force between micromirrors 94 and membrane 90. Micromirrors 94 are fabricated on the backside of the cell faceplate 106, which is coated with a transparent conductive layer 108 that shorts all of the mirrors together and holds them at a reference potential, suitably ground potential.

FEA 92 emits primary electrons that are accelerated through a potential $V_A$ through a collector grid 110 and strike attractor pads 104 on the backside of membrane 90. Secondary electrons are emitted from the pads and collected by grid 110, which is biased at potential $V_G$ above the reference potential, thereby leaving a net charge on attractor pads 104. This charge induces mirror charges on attractor pads 102 that modulates the local membrane potential. The potential difference between the membrane and the micromirror produces an attractive force that deflects the mirror toward the membrane. The mirrors can be erased by forming a secondary emission material (SEM) pad that partially covers attractor pad 104, switching the FEA landing energy or by controlling the bias potential on the collector grid. This particular configuration does have the drawback that the surface of the micromirror has an optically absorbant coating 112 is exposed when the mirror is in its fully actuated position.

While several illustrative embodiments of the invention have been shown and described, numerous variations and alternate embodiments will occur to those skilled in the art. For example, a color display can be implemented by forming the mirrors on a substrate that is color with red, green and blue stripes. Such variations and alternate embodiments are contemplated, and can be made without departing from the spirit and scope of the invention as defined in the appended claims.

We claim:

1. A flat-panel direct-view display, comprising:

a background;

an array of electrostatically-actuated cantilevered micromirrors on a substrate in front of said background, said micromirrors having a hinge that is capable of deflecting the micromirror over a range from a first state in which the micromirror covers a portion of the background to a second state in which the micromirror uncovers a substantial majority of said portion of the background;

a reference surface; and a flat-panel source that addresses either said array of micromirrors or said reference surface with a plurality of electron beams a row at a time while the other is held at a reference potential to modulate the potential difference between each said micromirror and said reference surface and thereby adjust the deflection of said micromirrors over said range to produce a direct-view image.

2. The flat-panel direct-view display of claim 1, wherein said micromirror deflects approximately 90 degrees between said first and second states.

3. The flat-panel direct-view display of claim 1, wherein said first state is the hinge's quiescent state and said second state is its filly actuated state.

4. The flat-panel direct-view display of claim 1, wherein each said micromirror has opposing light absorbing and light reflecting surfaces, said light absorbing surface absorbing incident light when said micromirror is in said first state and said light reflecting surface reflecting incident light to the background when said micromirror is in said second state.

5. The flat-panel direct-view display of claim 1, wherein said flat-panel source is patterned and aligned to direct said electron beams onto said hinges.

6. The flat-panel direct-view display of claim 5, wherein said flat-panel source is on said substrate underneath said hinges.

7. The flat-panel direct-view display of claim 5, wherein said hinge exhibits a secondary emission coefficient less than unity at the landing energy of said electron beams, further comprising a secondary emission material (SEM) pad on each said hinge that exhibits a secondary emission coefficient greater than unit at the same landing energy.

8. The flat-panel direct-view display of claim 1, wherein said flat-panel source comprises a field emitter array (FEA).

9. The flat-panel direct-view display of claim 1, wherein said substrate has a translucent whitish surface, further comprising a backlight that transmits light through said substrate to form said background.

10. A flat-panel direct-view display, comprising:

a whitish background;

an array of electrostatically-actuated cantilevered micromirrors on a substrate in front of said background, each said micromirror comprising opposing light absorbing and light reflecting surfaces and a hinge that deflects the micromirror over a range from a first state in which the mirror covers a portion of the background and absorbs incident light to a second state in which the mirror uncovers a substantial majority of said portion of the background and reflects incident light to the background;

a secondary emission material (SEM) pad on each said hinge;

a reference electrode that is held at reference potential and positioned to allow said micromirrors to deflect over said range without experiencing snap-over; and a patterned flat-panel source that is aligned with the micromirror hinges and addresses the micromirrors a row at a time by selectively depositing charge on their hinges and SEM pads to modulate the potential difference between each said micromirror and said reference electrode thereby adjusting the deflection of said micromirrors over said range to produce a grey scale direct-view image.

11. The flat-panel direct-view display of claim 10, wherein said patterned flat-panel source is on said substrate underneath said hinges.

12. The flat-panel direct-view display of claim 11, wherein said substrate has a translucent whitish surface on which said micromirrors and said flat-panel source are supported, further comprising a backlight behind said substrate.

13. The flat-panel direct-view display of claim 10, wherein said patterned flat-panel source is on another transparent substrate opposite the substrate that supports the micromirrors.

14. The flat-panel direct-view display of claim 13, further comprising a secondary collector grid that collects secondary electrons ejected from the hinges and provides said reference electrode.

15. The flat-panel direct-view display of claim 10, wherein said patterned flat-panel source is on said substrate underneath said hinges, further comprising a secondary collector grid between said flat-panel source and said micromirrors that collects secondary electrons ejected from the hinges and provides said reference electrode so that said micromirrors are actuated from their second state to their first state.

16. A flat-panel direct-view display, comprising:

a vacuum cell having a faceplate;

a substrate having a translucent whitish surface in said vacuum cell;

a backlight in said cell that transmits light through said substrate;

an array of electrostatically-actuated cantilevered micromirrors on said substrate, each said micromirror having opposing light reflecting and light absorbing surfaces and a hinge that is elevated above said substrate to deflect the micromirror over a range from the hinge's quiescent state in which the mirror covers a portion of the substrate and absorbs incident light to a fully actuated state in which the mirror uncovers a substantial majority of said portion and reflects incident light to the substrate;

a reference electrode on an interior surface of said faceplate that is held at a reference potential and spaced apart from said substrate at a distance that allows said micromirrors to deflect over said range without contacting the reference electrode; and a flat-panel source on said substrate underneath the elevated hinges that addresses the micromirrors' a row at a time by depositing charge on their hinges to modulate the potential difference between each said micromirror and said reference electrode thereby adjusting the deflection of said micromirrors over said range to produce a grey scale direct-view image.

17. The flat-panel direct-view display of claim 16, wherein said micromirror deflects approximately 90 degrees between its quiescent and fully actuated states.

18. The flat-panel direct-view display of claim 16, wherein said flat-panel source is patterned to lie only underneath said hinges.

19. The flat-panel direct-view display of claim 16, wherein said hinge exhibits a secondary emission coefficient less than unity at the landing energy of said electron beams, further comprising a secondary emission material (SEM) pad on each said hinge that exhibits a secondary emission coefficient greater than unit at the same landing energy.

20. The flat-panel direct-view display of claim 16, wherein said flat-panel source comprises a field emitter array (FEA).

21. A flat-panel direct-view display, comprising:

a background;

a floating potential insulating membrane;

a transparent substrate juxtaposed with said membrane;

an array of electrostatically-actuated cantilevered micromirrors on said substrate opposite said membrane and in front of said background, each said micromirror having hinge that is capable of deflecting the micromirror over a range from the hinge's quiescent state in which the mirror covers a portion of the background to a fully actuated state in which the mirror uncovers a substantial majority of said portion of the background; and a flat-panel source that addresses said membrane with a plurality of electron beams a row at a time to deposit a charge pattern on the membrane while the array of micromirrors is held at a reference potential to modulate the potential differences between the membrane and each said micromirror thereby adjusting the deflection of said micromirrors toward the membrane over said range to produce a grey scale direct-view image.

22. The flat-panel direct-view display of claim 21, wherein said micromirror deflects approximately 90 degrees between its quiescent and fully actuated states.

23. The flat-panel direct-view display of claim 21, further comprising an insulating post array on said flat-panel source that supports said membrane.

24. The flat-panel direct-view display of claim 21, further comprising:

a first array of attractor pads on said membrane on which said charge pattern is deposited; and a second array of attractor pads on the other side of said membrane that mirrors the charge pattern said otherside of the membrane to deflect said micromirrors.

* * * * *

UNITED STATES PATENT AND TRADEMARK OFFICE
CERTIFICATE OF CORRECTION

PATENT NO.    : 6,031,656
DATED         : February 29, 2000
INVENTOR(S)   : Little et al.

Page 1 of 1

It is certified that error appears in the above-identified patent and that said Letters Patent is hereby corrected as shown below:

<u>Column 9</u>,
Line 23, delete "filly", insert -- fully --.

Signed and Sealed this

Fourth Day of June, 2002

Attest:

JAMES E. ROGAN
*Attesting Officer*    *Director of the United States Patent and Trademark Office*